United States Patent
Bangalore Srinivas et al.

(10) Patent No.: US 11,840,437 B1
(45) Date of Patent: Dec. 12, 2023

(54) FORK ASSEMBLY FOR AUTONOMOUS MOBILE ROBOTS AND AUTOMATED GUIDED VEHICLES

(71) Applicant: Tata Consultancy Services Limited, Mumbai (IN)

(72) Inventors: Venkatesh Prasad Bangalore Srinivas, Bangalore (IN); Raghav Ponnath, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 18/334,587

(22) Filed: Jun. 14, 2023

(30) Foreign Application Priority Data

Jul. 5, 2022 (IN) .............................. 202221038703

(51) Int. Cl.
*B66F 9/12* (2006.01)
*B66F 9/20* (2006.01)

(52) U.S. Cl.
CPC ................ *B66F 9/122* (2013.01); *B66F 9/20* (2013.01)

(58) Field of Classification Search
CPC .. B66F 9/12; B66F 9/122; B66F 9/142; B66F 9/143; B66F 280/4312; B62B 3/0625; B62B 3/06
See application file for complete search history.

(56) References Cited

FOREIGN PATENT DOCUMENTS

| CN | 208898451 U | * | 5/2019 |
|----|----|----|----|
| CN | 111362190 A | * | 7/2020 |
| CN | 111699151 A |   | 9/2020 |
| CN | 112811352 A | * | 5/2021 |
| CN | 113003491 A | * | 6/2021 |
| CN | 216336405 U | * | 4/2022 |
| CN | 115215256 A | * | 10/2022 |
| CN | 115231473 A | * | 10/2022 |
| CN | 115367670 A | * | 11/2022 |
| EP | 0520137 A1 | * | 12/1992 |
| EP | 0562482 B1 |   | 9/1996 |
| KR | 101601933 B1 | * | 3/2016 |
| WO | WO1995030618 A1 |   | 11/1995 |

* cited by examiner

*Primary Examiner* — Diem M Tran
(74) *Attorney, Agent, or Firm* — Finnegan, Henderson, Farabow, Garrett & Dunner, LLP

(57) ABSTRACT

Conventional fork-type autonomous mobile robots (AMRs) have been suited to handle pallets and are typically designed with two forks. Such AMRs are very bulky in nature and specifically designed for a cart handling application, and usually have large openings and less suitable for lifting roller carts. Present disclosure provides a fork assembly for AMRs/Autonomous Guided Vehicles (AGVs) for transporting roller cages/carts within warehouses. The fork assembly when integrated with AMR enables performing various tasks. More specifically, the fork assembly includes a first plate and a second plate. The fork assembly further include roller movement enabler blocks that are driven by respective fork motors. Movement of the roller movement enabler blocks enable rolling of rollers on respective roller guides within tapered region thereby enable lowering and rising of the second plate with reference to the first plate for lifting a payload and movement thereof to a desired location.

12 Claims, 6 Drawing Sheets

FORK ASSEMBLY FOR AUTONOMOUS MOBILE ROBOTS AND AUTOMATED GUIDED VEHICLES

PRIORITY CLAIM

This U.S. patent application claims priority under 35 U.S.C. § 119 to: India Application No. 202221038703, filed on Jul. 5, 2022. The entire contents of the aforementioned application are incorporated herein by reference.

TECHNICAL FIELD

The disclosure herein generally relates to fork assemblies, and, more particularly, to a fork assembly for autonomous mobile robots and automated guided vehicles.

BACKGROUND

Traditionally, forklift types have been made available for automated guided vehicles (AGVs) and autonomous mobile robots (AMRs). These robots have applications in logistic warehouses, smart factories postal industries and the like, across the world. Most factories/manufacturing units are adopting AGVs and/or AMRs to serve as a smart factory setup thus enabling increased safety, reduced infrastructure cost, and improvement in production time.

It is therefore important for logistics manufacturing units/organizations to demand for compact and multi-purpose forklift AMRs/AGVs that can optimally utilize given environment space and thereby achieve speedy handling of stringer and non-stringer pallet types. Conventionally available vehicles such as fork-type autonomous mobile robots (AMRs) are suited for handling pallets and are mostly designed with two forks. These AMRs are very bulky in nature and are designed specifically for a cart handling application and have large openings. Such AMRs also are equipped with a mast unit for lifting of payload, which results in higher design and infrastructure costs.

SUMMARY

Embodiments of the present disclosure present technological improvements as solutions to one or more of the above-mentioned technical problems recognized by the inventors in conventional systems.

For example, in one aspect, there is provided a fork assembly for autonomous mobile robots and automated guided vehicles. The fork assembly a first plate having a first end and a second end, wherein the first plate comprises a first side wall and a second side wall, wherein each of the first side wall and the second side wall comprises a first Linear Motion (LM) guide rail and a second Linear Motion (LM) guide rail mounted therein respectively, and wherein each of the first Linear Motion (LM) guide rail and the second Linear Motion (LM) guide rail comprises one or more LM blocks; a first motor mount bracket and a second motor mount bracket mounted on an inner surface of the first plate, wherein each of the first motor mount bracket and the second motor mount bracket comprises a corresponding hole; a first fork motor and a second fork motor mounted to the corresponding hole of the first motor mount bracket and the second motor mount bracket, wherein the first fork motor and the second fork motor comprises a first rotor shaft and a second rotor shaft, each of the first rotor shaft and the second rotor shaft comprise a first end and a second end, wherein the first end of each of the first rotor shaft and the second rotor shaft serves as an integral component of the first fork motor and the second fork motor respectively; a first LM nut and a second LM nut connected to the second end of the first rotor shaft and the second rotor shaft respectively; a first roller movement enabler block and a second roller movement enabler block, each of the first roller movement enabler block and the second roller movement enabler block comprises of a first side and a second side, wherein the first side of the first roller movement enabler block and the second roller movement enabler block comprises a corresponding hole, wherein the corresponding hole is configured to receive the first LM nut and the second LM nut, and wherein the second side of the first roller movement enabler block and the second roller movement enabler block comprises a first roller guide and a second roller guide that are tapered at one or more pre-defined angles, wherein each of the first roller guide and the second roller guide comprise a first end and a second end; a second plate; a first roller mount and a second roller mount, each of the first roller mount and the second roller mount comprises: a first end and a second end, wherein the first end of the first roller mount and the second roller mount is fixed to the second plate; and a first flange and a second flange, each of the first flange and the second flange comprises a corresponding hole; and a first roller and a second roller fixed to the corresponding hole of the first flange and the second flange respectively.

In an embodiment, the first motor mount bracket and the second motor mount bracket are mounted at a position on the inner surface of the first plate such that the first fork motor and the second fork motor are separated by a pre-defined distance.

In an embodiment, the first fork motor and the second fork motor are facing opposite to each other.

The fork assembly further comprises a roller resting region at the second end of each of the first roller guide and the second roller guide. In an embodiment, the first roller guide and the second roller guide are adjacent to a first corresponding side wall and a second corresponding side wall of the first roller movement enabler block and the second roller movement enabler block.

In an embodiment, the first roller guide and the second roller guide are tapered at a first pre-defined angle amongst the one or more pre-defined angles with reference to height of the first roller movement enabler block and the second roller movement enabler block.

In an embodiment, the first roller guide and the second roller guide are tapered at a second pre-defined angle amongst the one or more pre-defined angles with reference to width of a tapered region formed on the first roller guide (130A) and the second roller guide of the first roller movement enabler block and the second roller movement enabler block.

The fork assembly comprises a first enclosure and a second enclosure, wherein each of the first enclosure and the second enclosure is configured to accommodate the first rotor shaft and the second rotor shaft.

In an embodiment, the first fork motor and the second fork motor are configured to rotate the first rotor shaft and the second rotor shaft in a first direction. Rotation of the first rotor shaft and the second rotor shaft drives the first roller movement enabler block and the second roller movement enabler block in a second direction. Driving of the first roller movement enabler block and the second roller movement enabler block in the second direction causes the first roller and the second roller to move from a position to displace the second plate from an initial position to a desired position.

In an embodiment, the first fork motor and the second fork motor are configured to rotate the first rotor shaft and the second rotor shaft in a third direction. Rotation of the first rotor shaft and the second rotor shaft drives the first roller movement enabler block and the second roller movement enabler block in a second direction. Driving of the first roller movement enabler block and the second roller movement enabler block in the second direction causes the first roller and the second roller to move from a position to displace the second plate from an initial position to a desired position.

In an embodiment, when the first roller and the second roller move from an initial position to the roller resting region the second plate attains a final position.

In an embodiment, the fork assembly further comprises a first retainer and a second retainer. Each of the first retainer and the second retainer comprises a first flange and a second flange; and a compression spring between the first flange and the second flange. The first retainer and the second retainer are configured to counter an undesired movement of the second plate.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
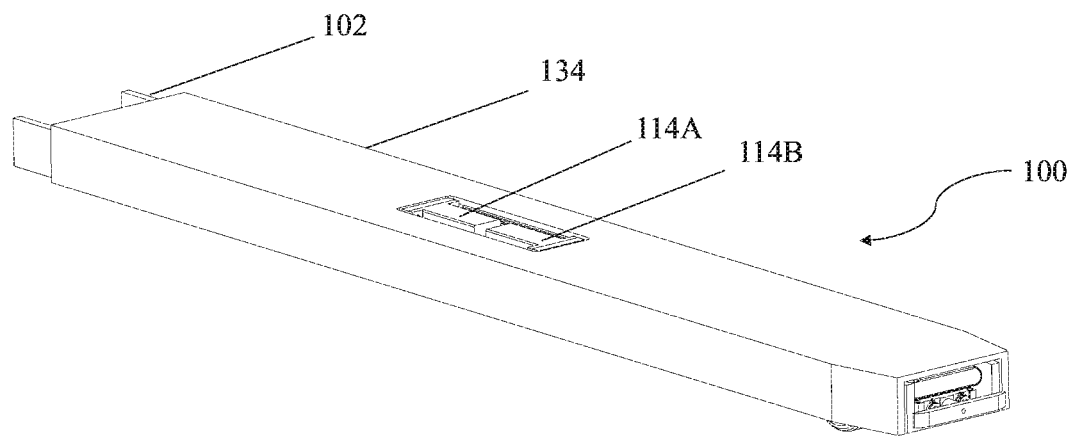
FIG. 1A illustrates a front perspective view of a fork assembly, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As mentioned earlier, conventionally available vehicles such as fork type autonomous mobile robots (AMRs) are suited for handling pallets and are mostly designed with two forks. Though, these AMRs may not be bulky in nature, the forks of such AMRS are designed specifically for a cart handling application and have large openings. Such AMRs also are equipped with a mast unit for lifting of payload, which results in further higher design and infrastructure costs.

Embodiments of the present disclosure provide a fork assembly that when integrated with autonomous mobile robots (AMRs) and/or Automated Guided Vehicles (AGVs) enables lifting of various payloads. Currently there is high surge in demand of material handling automation in companies dealing with logistics application manufacturing, postal, distribution, logistics, ecommerce, etc. The fork assembly when integrated with autonomous mobile robots (AMRs) and/or Automated Guided Vehicles (AGVs) serves as a helpful compact component in the field where there is requirement of lifting of the payloads and transferring of payloads to desired locations. More specifically, the fork assembly structurally comprises various components in such a way that it is capable of lifting very high loads with low power from motor and/or battery. Further, the designed fork assembly described herein helps cut down the motor power and torque required to lift a heavy load (or payload) hence allowing higher capacity payloads to lifted with low-capacity motors. Moreover, the fork assembly is structurally designed for integration with AMRs/AGVs for lifting pallets and roller cages with utmost efficiency in terms of energy usage, thereby ensuring energy savings and reduced carbon footprint.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

Reference numerals of one or more components of the chassis with an integrated fork assembly as depicted in the FIGS. 1 through 10 are provided in Table 1 below for ease of description:

TABLE 1

| Sl. No | Component | Numeral reference |
|---|---|---|
| 1 | Fork assembly | 100 |
| 2 | Fork plate | 102 |
| 3 | A first end of the fork plate | 104A |
| 4 | A second end of the fork plate | 104B |
| 5 | A first side wall of the first plate | 106A |
| 6 | A second side wall of the first plate | 106B |
| 7 | A first Linear Motion (LM) guide rail | 108A |
| 8 | A second Linear Motion (LM) guide rail | 108B |
| 9 | One or more LM blocks | 110A-N |
| 10 | A first motor mount bracket (FMMB) | 112A |
| 11 | A second motor mount bracket (SMMB) | 112B |
| 12 | A first fork motor | 114A |
| 13 | A second fork motor | 114B |
| 14 | A corresponding hole of the FMMB and SMMB | 116A-B |
| 15 | A first rotor shaft (FRS) | 118A |
| 16 | A second rotor shaft (SRS) | 118B |
| 17 | A first end of the FRS and SRS | 120A |
| 18 | A second end of the FRS and SRS | 120B |
| 19 | A first LM nut | 122A |
| 20 | A second LM nut | 122B |
| 21 | A first roller movement enabler block (FRMEB) | 124A |
| 22 | A second roller movement enabler block (SRMEB) | 124B |
| 23 | A first side of the FRMEB and SRMEB | 126A |
| 24 | A second side of the FRMEB and SRMEB | 126B |
| 25 | A corresponding hole of the FRMEB and SRMEB | 128A-B |
| 26 | A first roller guide (FRG) | 130A |
| 27 | A second roller guide (SRG) | 130B |
| 27 | A first end of the FRG and SRG | 132A |
| 28 | A second end of the FRG and SRG | 132B |
| 29 | A second plate | 134 |
| 30 | A first roller mount (FRM) | 136A |
| 31 | A second roller mount (SRM) | 136B |
| 32 | A first end of the FRM and SRM | 138A |
| 33 | A second end of the FRM and SRM | 138B |
| 34 | A first flange (FF) | 140A |
| 35 | A second flange (SF) | 140B |
| 36 | A corresponding hole of the FF and SF | 142A-B |
| 37 | A first roller | 144A |
| 38 | A second roller | 144B |
| 39 | A roller resting region | 146A-B |
| 40 | A tapered region | 148 |
| 41 | A first retainer (FR) | 150A |
| 42 | A second retainer (SR) | 150B |
| 43 | A first flange of the FR and SR | 152A |
| 44 | A second flange of the FR and SR | 152B |
| 45 | A compression spring | 154 |
| 46 | A first enclosure | 156A |
| 47 | A second enclosure | 156B |
| 48 | Clamp | 158 |

Figure 1B:
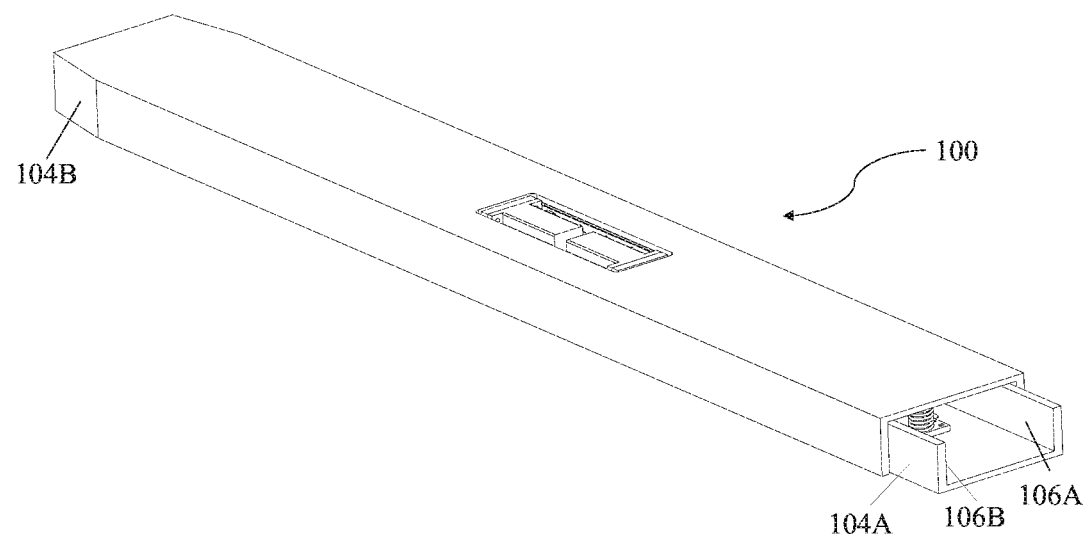
FIG. 1B illustrates a rear perspective view of the fork assembly, in accordance with an embodiment of the present disclosure.
Figure 1C:
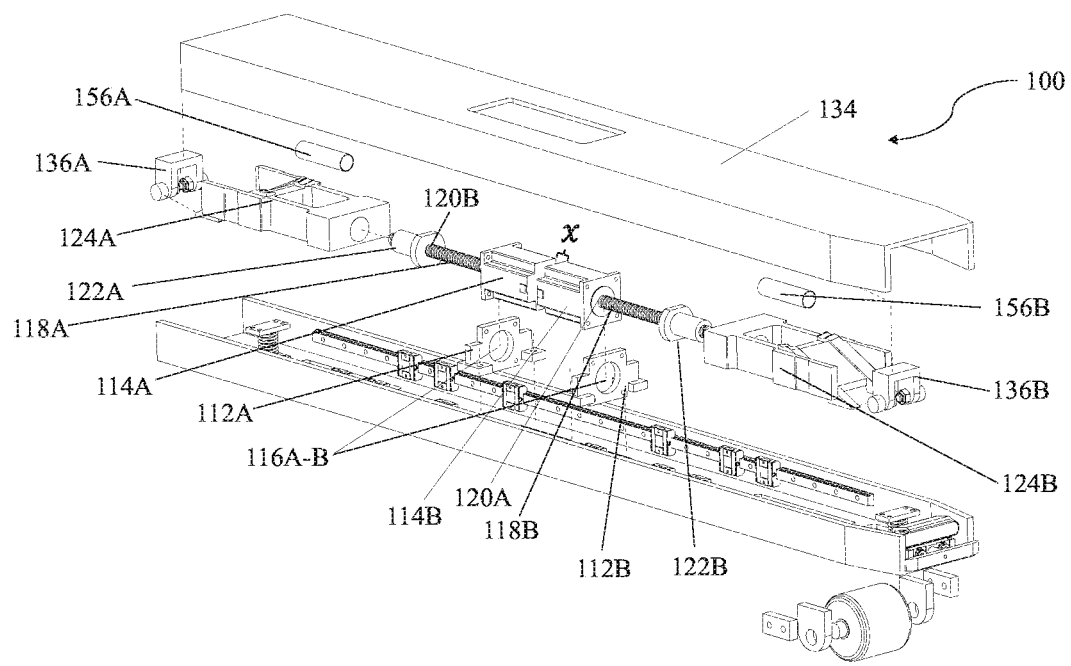
FIG. 1C illustrates a perspective view of the fork assembly depicting various integral components comprised therein, in accordance with an embodiment of the present disclosure.
Figure 2:
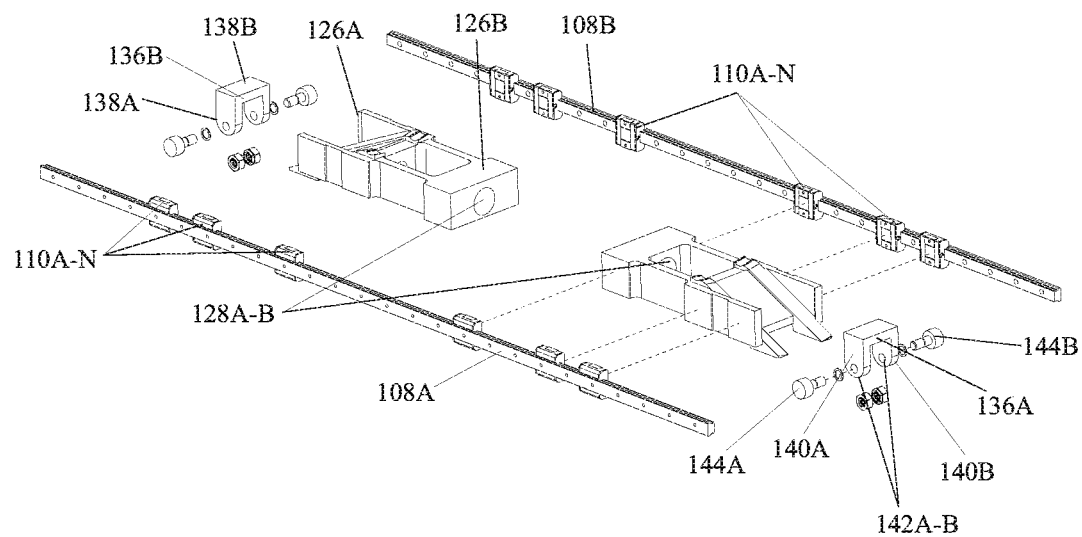
FIG. 2 depicts various components comprised in the fork assembly 100 of FIGS. 1A through 1C, in accordance with an embodiment of the present disclosure.

FIG. 1A illustrates a front perspective view of a fork assembly 100, in accordance with an embodiment of the present disclosure. FIG. 1B, with reference to FIG. 1A, illustrates a rear perspective view of the fork assembly 100, in accordance with an embodiment of the present disclosure. FIG. 1C, with reference to FIGS. 1A and 1B, illustrates a perspective view of the fork assembly 100 depicting various integral components comprised therein, in accordance with an embodiment of the present disclosure. The fork assembly 100 may also be referred as 'apparatus 100' and interchangeably used herein. The apparatus 100 will now be explained in conjunction with FIGS. 1A through 1C. The apparatus 100/fork assembly 100 comprises a first plate 102. The first plate 102 is also referred as a bottom plate and may be interchangeably used herein. The first plate 102 (bottom plate) comprises having a first end 104A and a second end 104B. The first plate 102 further comprises a first side wall 106A and a second side wall 106B. Each of the first side wall 106A and the second side wall 106B comprises a first Linear Motion (LM) guide rail 108A and a second Linear Motion (LM) guide rail 108B mounted therein respectively. In other words, the first Linear Motion (LM) guide rail 108A and the second Linear Motion (LM) guide rail 108B are mounted on the first side wall 106A and the second side wall 106B, respectively (refer FIG. 1C). For instance, the first side wall 106A has the first LM guide rail 108A mounted on it and the second side wall 106B has the second LM guide rail 108B mounted on it. Length of the first Linear Motion (LM) guide rail 108A and the second Linear Motion (LM) guide rail 108B may vary based on the structural design of the fork assembly 100 and the first plate 102. Further, one or more LM blocks 110A-N are fixed (or attached or connected) to each of the first Linear Motion (LM) guide rail 108A and the second Linear Motion (LM) guide rail 108B. These LM blocks 110A-N provide support to the first roller movement enabler block 124A and the second roller movement enabler block 124B and take both the load coming from the second plate 134 also the moment load acting on it. The first roller movement enabler block 124A and the second roller movement enabler block 124B are suspended on the LM blocks 110A-N without touching the inner surface of the first plate 102 (or the bottom surface of the fork assembly 100), hence providing it with smooth linear motion. The first and the second LM guide rails 108A-B and the one or more LM blocks 110A-N are depicted in FIG. 2. More specifically, FIG. 2, with reference to FIGS. 1A through 1C, depicts various components comprised in the fork assembly 100, in accordance with an embodiment of the present disclosure.

The fork assembly 100 further comprises a first motor mount bracket 112A and a second motor mount bracket 112B. The first motor mount bracket 112A and the second motor mount bracket 112B are mounted on an inner surface of the first plate 102. Each of the first motor mount bracket 112A and the second motor mount bracket 112B comprises a corresponding hole 116A-B. For instance, the first motor mount bracket 112A comprises the hole 116A and the second motor mount bracket 112B comprises the hole 116B.

The fork assembly 100 further comprises a first fork motor 114A and a second fork motor 114B that are mounted to the respective holes 116A-B. For instance, the first fork motor 114A is mounted to the hole 116A such that the first fork motor 114A is firmly held to prevent from any loose ends and fall. Similarly, the first fork motor 114B is mounted to the hole 116B such that the first fork motor 114B is firmly held to prevent from any loose ends and fall. Further, the first motor mount bracket 112A and the second motor mount bracket 112B are mounted at a position on the inner surface of the first plate 102 such that the first fork motor 114A and the second fork motor 114B are separated by a pre-defined distance (e.g., say 'x' distance—which may be in millimeter, centimeter, and the like). In an embodiment, the first fork motor 114A and the second fork motor 114B are positioned such that they face opposite to each other. Position of the first fork motor 114A with respect to position of the second fork motor 114B and these being separated by the pre-defined distance (e.g., 'x' distance) is shown in FIG. 1C.

Each of the first fork motor 114A and the second fork motor 114B comprises a first rotor shaft 118A and a second motor shaft 118B. For instance, the first fork motor 114A comprises the first rotor shaft 118A and the second fork motor 114B comprises the second rotor shaft 118B. A typical motor setup in such fork assembly 100 comprises a stator and a rotor (not shown in FIGS.). The rotor comprises a shaft which has two ends. In other words, each of the first rotor shaft 118A and the second rotor shaft 118B comprise a first end 120A and a second end 120B. The first end 120A of each of the first rotor shaft 118A and the second rotor shaft 118B serves as an integral component of the first fork motor 114A and the second fork motor 114B respectively. For instance, the first end 120A is either an integral component of the rotor or connected to the rotor. On the other hand, the second end 120B of the two shafts (e.g., the first rotor shaft and the second rotor shaft) serves as a lead screw.

The fork assembly 100 further comprises a first Linear Motion (LM) nut 122A and a second Liner Motion (LM) nut 122B. The first LM nut 122A is connected to the second end 120B of the first rotor shaft 118A and the second LM nut 122A is connected to the second end 120B of the second rotor shaft 118B. In other words, the first LM nut 122A and the second LM nut 122B are configured to receive the second end 120B of the of the first and the second rotor shaft 118A-B respectively. More specifically, at least a portion of the second end 120B serving as the lead screw is configured to be accommodate in the first LM nuts 122A and the second LM nuts 122B respectively. The first end 120A and the second end 120B and their coupling and/or connectivity to the fork motors 114A-B and the first and second LM nuts 122A-B is depicted in FIG. 1C.

The fork assembly 100 further comprises a first roller movement enabler block 124A and a second roller movement enabler block 124B. The first roller movement enabler block 124A and the second roller movement enabler block 124B may also referred as inclined block and interchangeably used herein, due to their structural design and requirement and formation of integral component of the fork assembly 100. Each of the first roller movement enabler block 124A and the second roller movement enabler block 124B comprises of a first side 126A and a second side 126B. The first side 126A of the first roller movement enabler block 124A and the second roller movement enabler block 124B comprises a corresponding hole 128A-B. For instance, the first side 126A of the first roller movement enabler block 124A comprises the hole 128A and the first side 126A of the second roller movement enabler block 124B comprises the hole 128B.

The first side 126A is designed as a square or rectangular block and forms a hollow space within it. The corresponding holes 128A-B are configured to receive the first LM nut 120A and the second LM nut 120B respectively. For instance, the hole 128A comprised on the first side 126A of the of the first roller movement enabler block 124A is configured to receive the first LM nut 120A, and the hole 128B comprised on the first side 126A of the of the second roller movement enabler block 124B is configured to receive the second LM nut 120B.

On the other hand, the second side 126B of the first roller movement enabler block 126A and the second roller movement enabler block 124B comprises a first roller guide 130A and a second roller guide 130B that are tapered at one or more pre-defined angles.

For instance, the first roller guide 130A and the second roller guide 130B are tapered at a first pre-defined angle (amongst the one or more pre-defined angles) with reference to height of the first roller movement enabler block 124A and the second roller movement enabler block 124B. In another instance, the first roller guide 130A and the second roller guide 130B are tapered at a second pre-defined angle (amongst the one or more pre-defined angles) with reference to width of a tapered region 148 formed on the first roller guide 130A and the second roller guide 130B of the first roller movement enabler block 124A and the second roller movement enabler block 124B.

Figure 4:
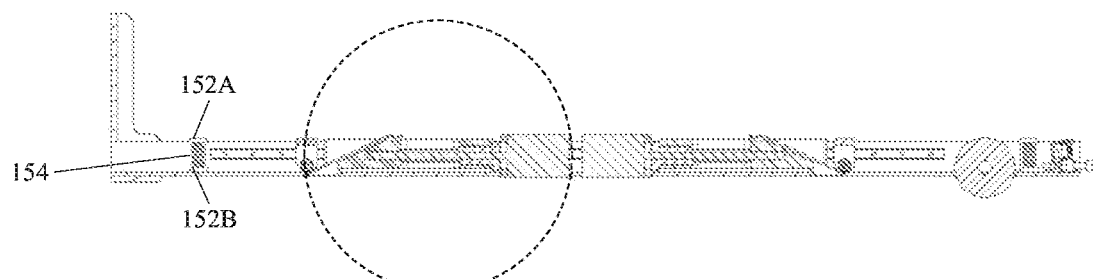
FIG. 4 illustrates a cross sectional view of the fork assembly of FIGS. 1A through 2 depicting a first flange and a second flange at both ends of the first retainer and the second retainer along with a compression spring, in accordance with an embodiment of the present disclosure.
Figure 5:
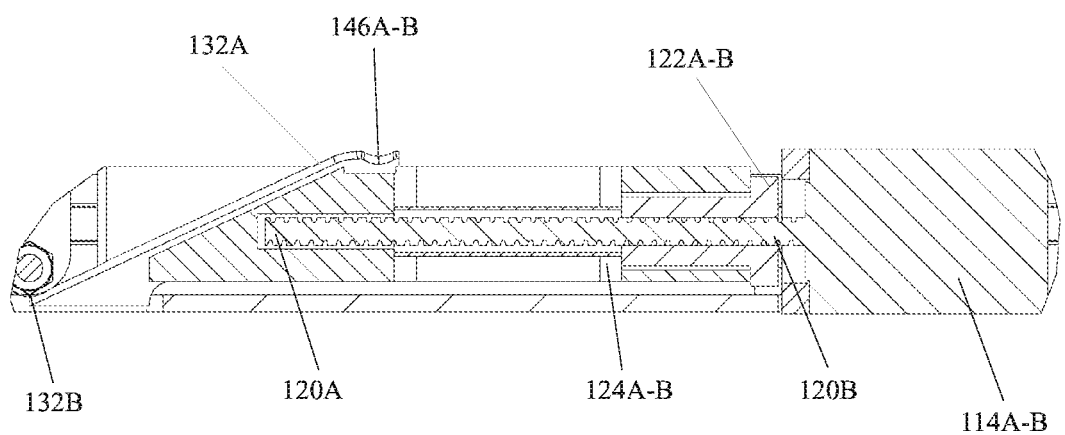
FIG. 5 illustrates a detailed view of a fork motor and a roller movement enabler block and other components comprised in the fork assembly of FIGS. 1A through 2, in accordance with an embodiment of the present disclosure.
Figure 6:
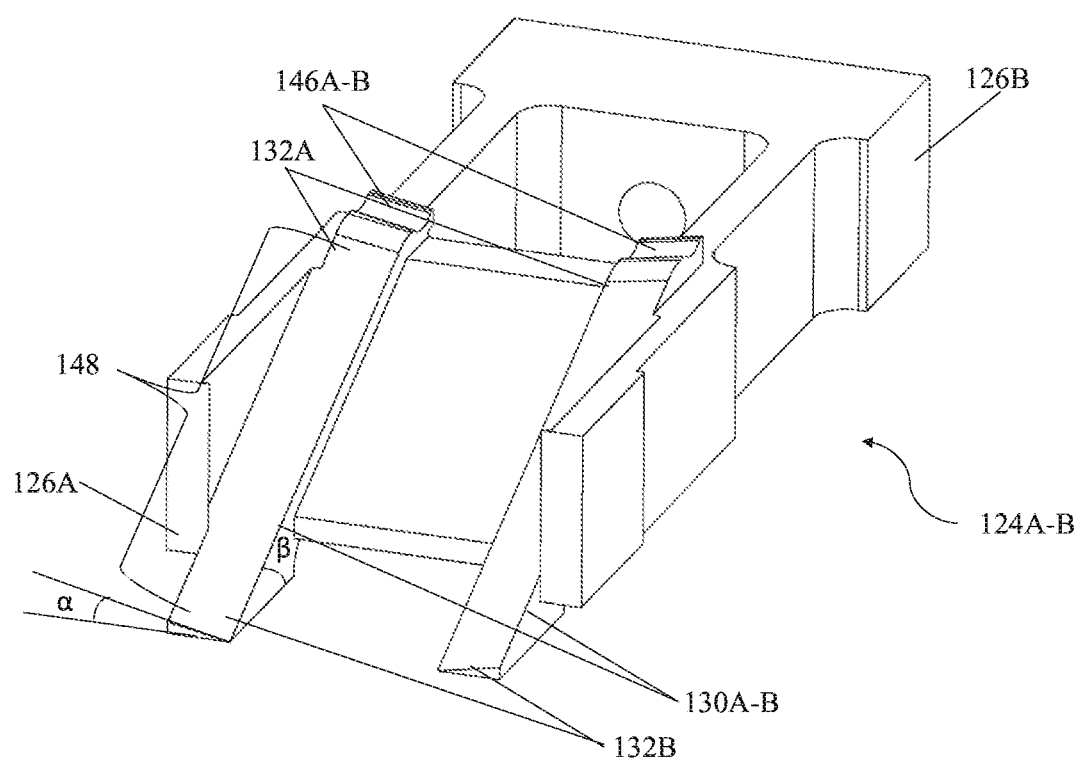
FIG. 6 illustrates a perspective of a first roller movement enabler block and a second roller movement enabler block with various components comprised therein, in accordance with an embodiment of the present disclosure.

Each of the first roller guide 130A and the second roller guide (130B) comprise a first end 132A and a second end 132B. The width of the tapered region 148 extends from the first end 132A through the second end 132B, in an example embodiment of the present disclosure. The first roller guide 130A and the second roller guide 130B are adjacent to a first corresponding side wall and a second corresponding side wall of the first roller movement enabler block 124A and the second roller movement enabler block 124B. More specifically, the first roller guide 130A is adjacent to the first corresponding side wall of the first roller movement enabler block 124A and the second roller movement enabler block 124B and tapered in nature to from the tapered region 148. FIG. 6, with reference to FIGS. 1A through 5, illustrates a perspective of the first roller movement enabler block 126A and the second roller movement enabler block 124B with various components comprised therein, in accordance with an embodiment of the present disclosure. The first pre-defined angle and the second pre-defined angles $\alpha$ and $\beta$ amongst the one or more pre-defined angles are formed by way of structural design (e.g., tapering) of the first roller guide 130A and the second roller guide 130B of the first roller movement enabler block 124A and the second roller movement enabler block 124B and are depicted in FIG. 6.

Referring to components of the fork assembly 100, the fork assembly 100 further comprises a second plate 134. The second plate 134 is also referred as a top plate and may be interchangeably used herein. The first end 104A and the second end 104B of the first plate 102 may also be realized for the second plate 134, in an example embodiment of the present disclosure. This realization may be accounted since the length and width of the first plate 102 and the second plate 134 are similar in design and structure.

The fork assembly 100 further comprises a first roller mount 136A and a second roller mount 136B. Each of the first roller mount 136A and the second roller mount 136B comprises a first end 138A and a second end 138B. The first end 138A of the first roller mount 136A and the second roller mount 136B is fixed to the second plate 134. For instance, the first roller mount 136A is positioned at the first end 104A of the first plate 102 and the second plate 134, and the second roller mount 136B is positioned at the second end 104B of the first plate 102 and the second plate 134 respectively. Top surface of the first roller mount 136A and the second roller mount 136A are either welded to an inner surface of the second plate 134 (top plate) or fixed to the second plate 134 in an alternative manner. For instance, the top surface of the first roller mount 136A and the second roller mount 136B may be provisioned by one or more holes. Similarly, the top plate may also be provisioned by one or more holes (not shown in FIGS.). In such scenarios, the first roller mount 136A and the second roller mount 136B may be fixed to (or connected to) the second plate 134 via the one or more associated holes comprised therein using one or more screw mechanisms.

Each of the first roller mount 136A and the second roller mount 136B comprises a first flange 140A and a second flange 140B. Each of the first flange 140A and the second flange 140B comprises a corresponding hold 142A-B. For example, the first flange 140A comprises the hole 142A and the second flange comprises the hole 142B.

Figure 7:
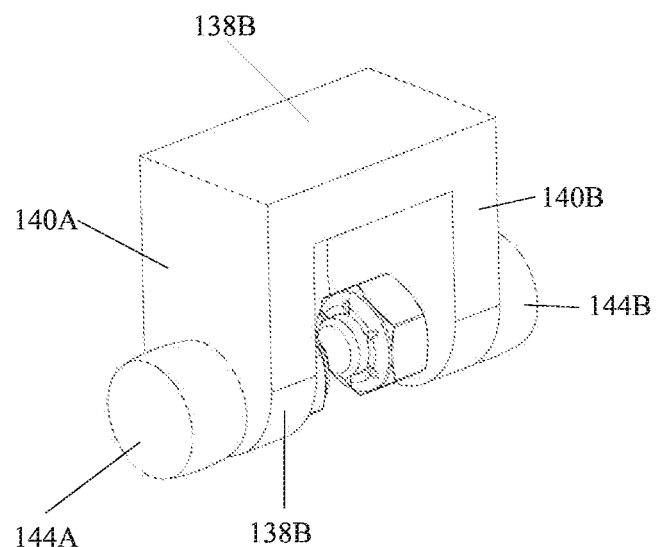
FIG. 7 illustrates a roller mount and one or more rollers coupled to respective holes of one or more flanges of the roller mount, in accordance with an embodiment of the present disclosure.

The fork assembly 100 further comprises a first roller 144A and a second roller 144B fixed to the corresponding hole 142A-B of the first flange 140A and the second flange 140B respectively. For instance, a set of the first roller 144A is used by the fork assembly 100. Similarly, a set of the second roller 144B is used by the fork assembly 100. The first roller 144A is connected to (or fixed to or attached to) the first flange 140A through the hole 142A and the second roller 144B is connected to (or fixed to or attached to) the second flange 140A through the hole 142B. Such fixation/connection or attachment is carried on both sides of the fork assembly 100 (e.g., the first end 104A and the second end 104B of the first plate 102. FIG. 7, with reference to FIGS. 1A through 6, illustrates a roller mount and one or more rollers coupled to respective holes 142A-B of one or more flanges 140A-B of the roller mount, in accordance with an embodiment of the present disclosure. The first roller 144A and a second roller 144B are structurally designed, positioned, and fixed (or coupled) to the first roller mount 136A and the second roller mount 136B such that the rollers 144A-B have freedom to rotate on their own axis.

The first roller 144A and the second roller 144B roll on the tapered region 148 during the operation of the fork assembly 100. For instance, the first fork motor 114A and the second fork motor 114B are configured to rotate the first rotor shaft 116A and the second rotor shaft 116B in a first direction respectively (e.g., say clockwise direction). Rotation of the first rotor shaft 116A) and the second rotor shaft 116B drives the first roller movement enabler block 124A and the second roller movement enabler block 124B in a second direction (e.g., say forward direction). Driving of the first roller movement enabler block 124A and the second roller movement enabler block 124B in the second direction causes the first roller 144A and the second roller 144B to move from a position to displace the second plate 134 from an initial position to a desired position.

In other words, the first fork motor 114A and the second fork motor 114B are powered with power supply (e.g., either by mains supply or through batteries) to rotate the first rotor shaft 116A and the second rotor shaft 116B in a first direction (e.g., say clockwise direction). Rotation of the first rotor shaft 116A and the second rotor shaft 116B in the clockwise direction drives the first roller movement enabler block 124A and the second roller movement enabler block 124B in the forward direction. Driving of the first roller movement enabler block 124A and the second roller movement enabler block 124B in the forward direction causes the first roller 144A and the second roller 144B to move on the tapered region 148 from a position (e.g., say initial position such as down to top rolling) to displace the second plate 134 from an initial position (e.g., say a position with reference to the base of the first plate 102 or ground surface). The displacement of second plate 134 in this scenario results in rising or moving of the second plate 134 in an upward direction and towards the roller resting region 146A-B.

Similarly, the first fork motor 114A and the second fork motor 114B are configured to rotate the first rotor shaft 116A and the second rotor shaft 116B in a third direction respectively (e.g., say anti-clockwise direction). Rotation of the first rotor shaft 116A and the second rotor shaft 116B drives the first roller movement enabler block 124A and the second roller movement enabler block 124B in a fourth direction (e.g., say backward direction). Driving of the first roller movement enabler block 124A and the second roller movement enabler block 124B in the fourth direction causes the first roller 144A and the second roller 144B to move from a position (e.g., say an attained position) to displace the second plate 134 from an initial position to a desired position.

In other words, the first fork motor 114A and the second fork motor 114B are powered with power supply (e.g., either by mains supply or through batteries) to rotate the first rotor shaft 116A and the second rotor shaft 116B in a third direction (e.g., say anti-clockwise direction). Rotation of the first rotor shaft 116A and the second rotor shaft 116B in the anti-clockwise direction drives the first roller movement enabler block 124A and the second roller movement enabler block 124B in the backward direction. Driving of the first roller movement enabler block 124A and the second roller movement enabler block 124B in the backward direction causes the first roller 144A and the second roller 144B to move on the tapered region 148 from a first position (e.g., say initial position such as from top to down rolling) to displace the second plate 134 from an initial position. The displacement of second plate 134 in this scenario results in lowering or moving of the second plate 134 in a downward direction and away from the roller resting region 146A-B. Further, swift movement (in forward and backward direction) of the first roller movement enabler block 124A and the second roller movement enabler block 124B is enabled by the first LM guide rail 108A and the second LM guide rail 108B and/or the LM blocks 110A-N.

Figure 3:
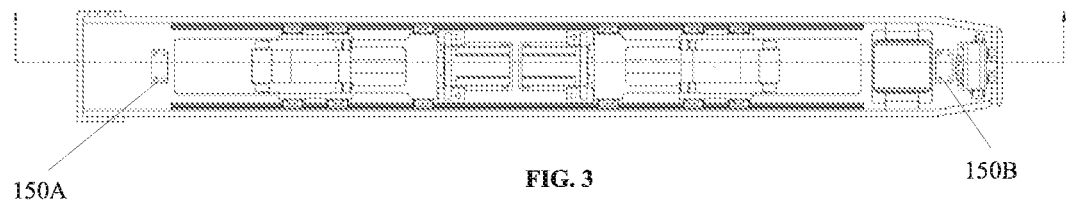
FIG. 3 illustrates a cross-sectional view plan of the fork assembly of FIGS. 1A through 2 depicting a first retainer and a second retainer, in accordance with an embodiment of the present disclosure.

When the first roller 144A and the second roller 144B move from a first position to the roller resting region 146A-B and rest on the roller resting region 146A-B the second plate 134 attains a final position. The final position attained by the second plate 134 when the first roller 144A and the second roller 144B are resting on the roller resting region 146A-B is referred to as 'a highest lifting height'. The expression "Lifting height" as used in the present disclosure herein refers to displacement of the second plate 134 from the first plate 102 by a distance. FIG. 5, with reference to FIGS. 1A through 4, illustrates a detailed view of a fork motor and a roller movement enabler block and other components comprised in the fork assembly 100, in accordance with an embodiment of the present disclosure.

To move the second plate 134 relative to the first plate 102 in the upward or downward both the fork motors 114A-B are operated to synchronously rotate in specific direction(s) (e.g., clockwise and/or anti-clockwise/counter-clockwise directions). This is done with the help of a motor controller (not shown in FIGS.— but may be either integral to the fork assembly 100 or external connected thereto or comprised in the AMR) which controls the direction of both the fork motors 114A-B. Encoder or an equivalent circuit or logic (not shown in FIGS.) in the fork motors 114A-B control the speed and position and provides feedback (based on level of lifting and lowering of the second plate 134) to the fork motors 114A-B to start or stop at various end points. Such operation may be controlled by the motor controller which may switch rotation via one or more logics provided by means of a system (e.g., either configured in the fork assembly 100 or externally connected to—not shown in FIGS.).

Figure 8:
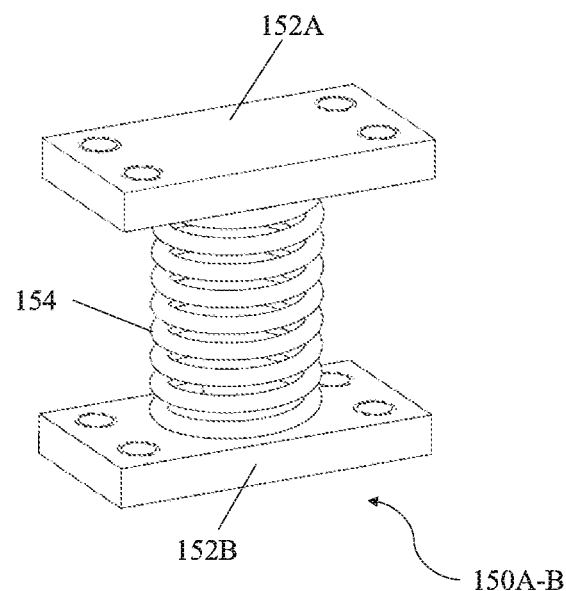
FIG. 8 depicts a detailed view of the first retainer and the second retainer along with the compression spring, in accordance with an embodiment of the present disclosure.

Referring to components of the fork assembly 100, the fork assembly 100 further comprises a first retainer 150A and a second retainer 150B. FIG. 3, with reference to FIGS. 1A through 2, illustrates a cross-sectional view plan of the fork assembly 100 of FIGS. 1A through 1C depicting the first retainer 150A and the second retainer 150B, in accordance with an embodiment of the present disclosure. The arrow depicted in FIG. 3 is presented to indicate the cross-sectional view plan for better understanding of the embodiments described herein. Each of the first retainer 150A and the second retainer 150B comprises a first flange 152A and a second flange 152B at both ends of the first retainer 150A and the second retainer 150B respectively. A compression spring 154 is attached (or fixed) between the first flange 152A and the second flange 152B. FIG. 4, with reference to FIGS. 1A through 3, illustrates a cross sectional view of the fork assembly 100 of FIGS. 1A through 1C depicting the first flange 152A and the second flange 152B at both ends of the first retainer 150A and the second retainer 150B along with the compression spring 154, in accordance with an embodiment of the present disclosure. FIG. 8, with reference to FIGS. 1A through 7, depicts a detailed view of the first retainer 150A and the second retainer 150B along with the compression spring 154, in accordance with an embodiment of the present disclosure. The first retainer 150A and the second retainer 150B are configured to counter an undesired movement of the second plate 134. For instance, there could be an undesired pulling of the first plate 102 or the second plate 134. In such scenarios. Such counter mechanism may be achieved by either welding the first flange 152A and the second flange 152B to an inner surface of the first plate 102 and the second plate 134 (top plate) or fixed to the first plate 102 and the second plate 134 in an alternative manner. For instance, the first flange 152A and the second flange 152B may be provisioned by one or more holes. Similarly, the first plate 102 and the second plate 134 may also be provisioned by one or more holes (not shown in FIGS.). In such scenarios, the first flange 152A and the second flange 152B mount 136B may be fixed to (or connected to) the first plate and the second plate 134 via the one or more associated holes comprised therein using one or more screw mechanisms. The fork assembly 100 further comprises a first enclosure 156A and a second enclosure 156B. The first enclosure 156A and the second enclosure 156B are configured to accommodate the first rotor shaft 116A and the second rotor shaft 116B.

Figure 9:
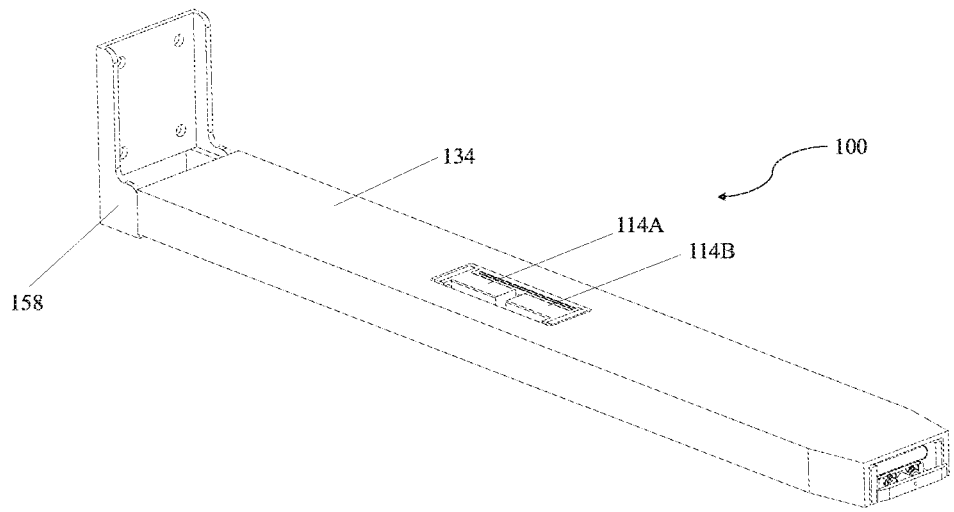
FIG. 9 depicts the fork assembly having a clamp, in accordance with an embodiment of the present disclosure.
Figure 10:
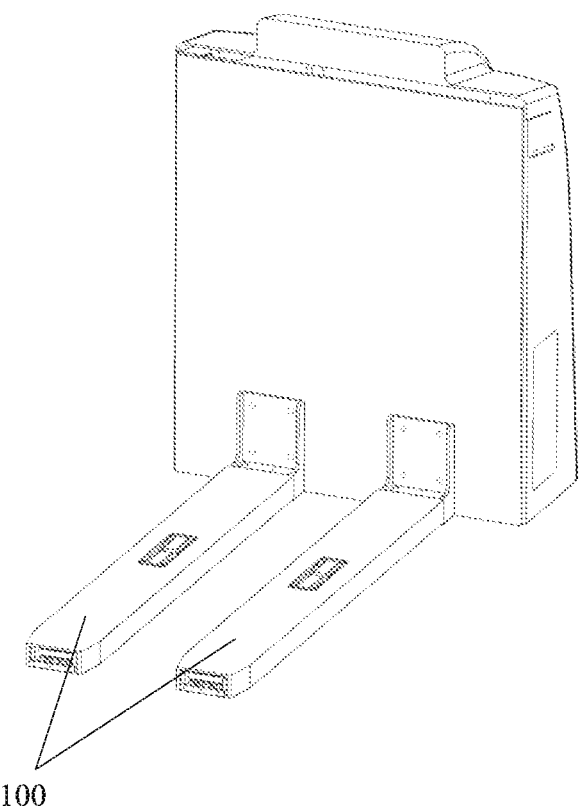
FIG. 10 depicts a rear view and a use case scenario of the fork assembly forming a part of (or connected to) an autonomous mobile robot (AMR), in accordance with an embodiment of the present disclosure.

As described above, the fork assembly 100 may form an attachable component or a fixable component to an autonomous mobile robot (AMR) or an autonomous guided vehicle (AGV) via one or more fixing components/means (e.g., either via hardware components such as clamps, or coupled via electrical buses/cables through appropriate interfaces as known in the art. FIG. 9, with reference to FIGS. 1A through 8, depicts the fork assembly 100 having a clamp 158, in accordance with an embodiment of the present disclosure. The clamp 158 may serve as a connector between an AMR/AGV and the fork assembly 100. FIG. 10, with reference to FIGS. 1A through 9, depict a use case scenario of the fork assembly 100 forming a part of (or connected to) the autonomous mobile robot (AMR) attached via the clamp 158, in accordance with an embodiment of the present disclosure. More specifically, FIG. 10, with reference to FIGS. 1A through 9, depicts a rear view and a use case scenario of the fork assembly 100 forming a part of (or connected to) the autonomous mobile robot (AMR), in accordance with an embodiment of the present disclosure. The fork assembly 100 when integrated to or operatively connected/coupled to the AMR (or AGV) may be equipped with other components such as a front panel that covers the integral components of the AMR/AGV. The AMR further comprises a display (not shown in FIGS.) to display information pertaining to the fork assembly 100, other interconnected/interoperability components, the AMR/AGV, placement/movement of the payload, and operation or operating procedures of the fork assembly 100 and the AMR/AGV, and the like. An emergency button may also incorporate in the AMR/AGV to bring the fork assembly 100 or the AMR/AGV to halt or stop from operating/functionality in case of anomalies, or inadvertent operations being performed (e.g., during placement and movement of the payload, navigation of the AMR/AGV, and the like). The AMR/AGV further comprises a light indicator (not shown in FIGS.) that indicates one or more states of the fork assembly 100 and/or the AMR/AGV via one or more light modes (e.g., green for working normal, red for malfunctioning of one or more components of the apparatus/AMR/AGV, and/or any other appropriate color modes to indicate a communication message that is specific to an operating mode or working of the fork assembly 100/AMR/AGV). As mentioned above, cameras or video capturing devices or sensors are also incorporated in the fork assembly 100 or in the AMR/AGVs to capture image/video data of the surrounding/environment during payload placement and movement/navigation. The cameras may be placed anywhere such as integral to the fork assembly at the tapered end (e.g., refer second end of the first plate 102) or at the other side (e.g., chassis (not shown in FIGS.) of the AMR/AGV). The cameras may also be referred as front camera, rear camera, side cameras, top cameras, bottom cameras, and the like and positioned accordingly. The AMR/AGV further comprises a rear panel (not shown in FIGS.) that is configured to cover the chassis or the entire apparatus. In other words, the rear panel may serve as a protective gear/protective cover element for the fork assembly 102.

The fork assembly 100 or the entire AMRs/AGVs when integrated with (or connected to or attached to) the fork assembly 100 may be operated based on instructions set comprised in a system (e.g., the system is either within the fork assembly 100 or the AMR/AGV or externally connected to the fork assembly 100 via I/O communication interfaces). For executing the instructions set(s) as mentioned above, the fork assembly 100 or the AMR/AGV may comprise (or comprises) the system (not shown in FIGS) that includes a memory for storing the instructions set(s), one or more input/output communication interfaces interface(s), one or more hardware processors. The one or more hardware processors are communicatively coupled to the memory via the one or more communication interfaces wherein the one or more hardware processors are configured by the instructions to execute and enable operation of each component of the fork assembly 100 (and/or the AMR/AGV) as described herein. More specifically, the movement of the fork assembly 100, the AMR/AGV, the fork assembly 100 operation and the working of the other components comprised in the fork assembly 100 as described above may be based on instructions set being executed by the one or more hardware processors for handling payload (either placed on the fork assembly 100 or to be placed or to be moved from one location to another location). Various components of the fork assembly 100 are (or may be) configured by the instructions set to perform the method described herein for handling the payload. The system may be mounted on the fork assembly 100, in one example embodiment of the present disclosure. The system may be housed on the fork assembly 100, in another example embodiment of the present disclosure. The system may be comprised in the fork assembly 100, in yet another example embodiment of the present disclosure. The system may be communicatively coupled to the fork assembly 100 via one or more communication interfaces as applicable and known in the art, in yet further example embodiment of the present disclosure. In such scenarios where it is communicatively coupled (or connected) to the fork assembly 100 (or the AMR/AGV), the fork assembly 100 (or AMR/AGV) may be provisioned with options and configured with suitable arrangement such that the fork assembly 100 can be operated via the connected/communicatively coupled system. The fork assembly 100 may be used and/or implemented in AMRs/AGVs for roller carts lifting, vertical rack in a goods to picker setup and the like. Other applications include, but are not limited to, warehouse and logistics environments, distribution centers where pallets and/or roller carts/cages are to be picked and placed from one location to another location. The fork assembly 100 may further be equipped with drive and/or swivel wheels (also referred as wheels and interchangeably used herein) that may be mounted to a bottom surface of the first plate 102 or form an integral part of the first plate 102 from bottom wherein the wheels may be mounted to wheel brackets (portion of a wheel can be seen in FIG. 1A—depicted as curve shaped below the bottom surface of the first plate 102, and a complete wheel is depicted and realized in FIG. 1C). The wheels when in operation may have various degree of freedom to rotate and drive the AMRs/AGVs in one or more direction(s) during payload placement and movement from one location to desired location.

The embodiments of the present disclosure address the technology gap by providing a compact fork assembly which can lift maximum payload with minimum possible reduced height and width of lifting mechanism. Further, length of the first plate 102 and the second plate 134 of the fork assembly 100 are structurally designed in such a way that it increases and supports bottom side of the payloads. The compactness has been brought out to address the various lifting cases in the warehouses or in the shop floors, etc. As mentioned above, the fork assembly 100 when integrated with AMRs/AGVs enables lifting of various pallets, carts/roller cages, and payloads.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A fork assembly comprising:
    a first plate having a first end and a second end, wherein the first plate further comprises a first side wall and a second side wall, wherein each of the first side wall and the second side wall comprises a first Linear Motion (LM) guide rail and a second Linear Motion (LM) guide rail mounted therein respectively, and wherein each of the first Linear Motion (LM) guide rail and the second Linear Motion (LM) guide rail comprises one or more LM blocks;
    a first motor mount bracket and a second motor mount bracket mounted on an inner surface of the first plate, wherein each of the first motor mount bracket and the second motor mount bracket comprises a corresponding hole; a first fork motor and a second fork motor mounted to the corresponding hole of the first motor mount bracket and the second motor mount bracket, wherein the first fork motor and the second fork motor comprises a first rotor shaft and a second rotor shaft, each of the first rotor shaft and the second rotor shaft comprise a first end and a second end, wherein the first end of each of the first rotor shaft and the second rotor shaft serves as an integral component of the first fork motor and the second fork motor respectively;
    a first LM nut and a second LM nut connected to the second end of the first rotor shaft and the second rotor shaft respectively;
    a first roller movement enabler block and a second roller movement enabler block, wherein each of the first roller movement enabler block and the second roller movement enabler block comprises of a first side and a second side, wherein the first side of the first roller movement enabler block and the second roller movement enabler block comprises a corresponding hole, wherein the corresponding hole is configured to receive the first LM nut and the second LM nut, and wherein the second side of the first roller movement enabler block and the second roller movement enabler block comprises a first roller guide and a second roller guide that are tapered at one or more pre-defined angles, wherein each of the first roller guide and the second roller guide comprises a first end and a second end;
    a second plate;
    a first roller mount and a second roller mount, wherein each of the first roller mount and the second roller mount comprises:
        a first end and a second end, wherein the first end of the first roller mount and the second roller mount is fixed to the second plate; and
        a first flange and a second flange, each of the first flange and the second flange comprises a corresponding hole; and
        a first roller and a second roller fixed to the corresponding hole of the first flange and the second flange respectively.

2. The fork assembly of claim 1, wherein the first motor mount bracket and the second motor mount bracket are mounted at a position on the inner surface of the first plate such that the first fork motor and the second fork motor are separated by a pre-defined distance.

3. The fork assembly of claim 1, wherein the first fork motor and the second fork motor are facing opposite to each other.

4. The fork assembly of claim 1, further comprises a roller resting region at the second end of each of the first roller guide and the second roller guide.

5. The fork assembly of claim 4, wherein the first roller and the second roller are configured to move from an initial position to the roller resting region such that the second plate attains a final position.

6. The fork assembly of claim 1, wherein the first roller guide and the second roller guide are adjacent to a first corresponding side wall and a second corresponding side wall of the first roller movement enabler block and the second roller movement enabler block.

7. The fork assembly of claim 1, wherein the first roller guide and the second roller guide are tapered at a first pre-defined angle amongst the one or more pre-defined angles with reference to height of the first roller movement enabler block and the second roller movement enabler block.

8. The fork assembly of claim 1, wherein the first roller guide and the second roller guide are tapered at a second pre-defined angle amongst the one or more pre-defined angles with reference to width of a tapered region formed on the first roller guide and the second roller guide of the first roller movement enabler block and the second roller movement enabler block.

9. The fork assembly of claim 8, wherein the first fork motor and the second fork motor are configured to rotate the first rotor shaft and the second rotor shaft in a first direction, wherein rotation of the first rotor shaft and the second rotor shaft drives the first roller movement enabler block and the second roller movement enabler block in a second direction, and wherein driving of the first roller movement enabler block and the second roller movement enabler block in the second direction causes the first roller and the second roller to move from position on the tapered region to displace the second plate from an initial position to a desired position.

10. The fork assembly of claim 1, wherein the first fork motor and the second fork motor are configured to rotate the first rotor shaft and the second rotor shaft in a third direction, wherein rotation of the first rotor shaft and the second rotor shaft drives the first roller movement enabler block and the second roller movement enabler block in a fourth direction, and wherein driving of the first roller movement enabler block and the second roller movement enabler block in the fourth direction causes the first roller and the second roller to move from a position to displace the second plate from an initial position to a desired position.

11. The fork assembly of claim 1, further comprises a first retainer and a second retainer, wherein each of the first retainer and the second retainer comprises:
   a first flange and a second flange; and
   a compression spring between the first flange and the second flange, wherein the first retainer and the second retainer are configured to counter an undesired movement of the second plate.

12. The fork assembly of claim 1, further comprises a first enclosure and a second enclosure, wherein each of the first enclosure and the second enclosure is configured to accommodate the first rotor shaft and the second rotor shaft.

* * * * *